United States Patent
Chang et al.

(10) Patent No.: US 9,552,046 B2
(45) Date of Patent: Jan. 24, 2017

(54) PERFORMANCE MANAGEMENT METHODS FOR ELECTRONIC DEVICES WITH MULTIPLE CENTRAL PROCESSING UNITS

(71) Applicant: HTC Corporation, Taoyuan, Taoyuan County (TW)

(72) Inventors: Wen-Yen Chang, Taoyuan (TW); Chih-Tsung Wu, Taoyuan (TW); Ching-Tsung Lai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 486 days.

(21) Appl. No.: 14/028,003

(22) Filed: Sep. 16, 2013

(65) Prior Publication Data

US 2014/0089700 A1 Mar. 27, 2014

Related U.S. Application Data

(60) Provisional application No. 61/704,283, filed on Sep. 21, 2012.

(51) Int. Cl.
| | |
|---|---|
| *G06F 1/00* | (2006.01) |
| *G06F 1/32* | (2006.01) |
| *G06F 9/50* | (2006.01) |

(52) U.S. Cl.
CPC ............ *G06F 1/324* (2013.01); *G06F 1/329* (2013.01); *G06F 1/3287* (2013.01); *G06F 9/5094* (2013.01); *Y02B 60/1217* (2013.01); *Y02B 60/1282* (2013.01); *Y02B 60/142* (2013.01); *Y02B 60/144* (2013.01)

(58) Field of Classification Search
CPC ........ G06F 1/324; G06F 1/206; G06F 1/3203; G06F 1/3243; G06F 1/325; G06F 1/3287; G06F 8/4432; G06F 9/00; G06F 9/30083; G06F 9/3009; G06F 9/3851; G06F 9/44594; G06F 9/50; G06F 9/505; G06F 9/5083; Y02B 60/1282
USPC ........ 713/322, 300, 320, 321, 323, 324, 501
See application file for complete search history.

(56) References Cited

U.S. PATENT DOCUMENTS

| | | | |
|---|---|---|---|
| 7,073,082 B2 | 7/2006 | Hsu | |
| 7,251,814 B2 | 7/2007 | Armstrong et al. | |
| 8,074,087 B2 * | 12/2011 | Laughlin | ............... G06F 1/3203 713/300 |

(Continued)

FOREIGN PATENT DOCUMENTS

| | | |
|---|---|---|
| CN | 1937591 A | 3/2007 |
| TW | I223772 A | 11/2004 |

(Continued)

*Primary Examiner* — Thomas Lee
*Assistant Examiner* — Aaron J Browne
(74) *Attorney, Agent, or Firm* — Birch, Stewart, Kolasch & Birch, LLP

(57) ABSTRACT

Performance management methods for an electronic device with multiple central processing units (CPUs) are provided. First, thread loading rearrangement and CPU frequency evaluation are performed to obtain a plurality of evaluated performance values for different amounts of CPUs, wherein the plurality of evaluated performance values are relevant to power consumption values of the multiple CPUs. It is then determined whether to adjust an amount of used CPUs based on the plurality of evaluated performance values corresponding to the different amounts of CPUs.

18 Claims, 7 Drawing Sheets

(56) References Cited

U.S. PATENT DOCUMENTS

| | | | |
|---|---|---|---|
| 8,214,679 B2* | 7/2012 | Ishikawa | G06F 1/3228 |
| | | | 713/323 |
| 2008/0172565 A1 | 7/2008 | Chu et al. | |
| 2008/0189569 A1 | 8/2008 | Chu | |
| 2009/0109230 A1* | 4/2009 | Miller | G06F 1/3203 |
| | | | 345/506 |
| 2009/0319812 A1 | 12/2009 | Laughlin | |
| 2011/0145616 A1* | 6/2011 | Rychlik | G06F 1/324 |
| | | | 713/323 |
| 2011/0154348 A1* | 6/2011 | Elnozahy | G06F 1/324 |
| | | | 718/104 |
| 2012/0117403 A1* | 5/2012 | Bieswanger | G06F 1/3206 |
| | | | 713/322 |
| 2012/0185709 A1* | 7/2012 | Weissmann | G06F 1/3234 |
| | | | 713/320 |
| 2012/0216054 A1* | 8/2012 | Cho | G06F 1/3287 |
| | | | 713/300 |
| 2014/0143783 A1* | 5/2014 | Bose | G06F 1/324 |
| | | | 718/102 |
| 2014/0237274 A1* | 8/2014 | Murakami | G06F 1/3243 |
| | | | 713/320 |

FOREIGN PATENT DOCUMENTS

| | | |
|---|---|---|
| TW | 200830114 A | 7/2008 |
| TW | 200834422 A | 8/2008 |
| WO | WO 2012/069881 A1 | 5/2012 |

\* cited by examiner

500

PERFORMANCE MANAGEMENT METHODS FOR ELECTRONIC DEVICES WITH MULTIPLE CENTRAL PROCESSING UNITS

CROSS REFERENCE TO RELATED APPLICATIONS

This application claims the benefit of U.S. Provisional Application No. 61/704,283, filed Sep. 21, 2012, the entirety of which is incorporated by reference herein.

BACKGROUND OF THE INVENTION

Field of the Invention

The disclosure relates generally to performance management methods and related electronic devices, and, more particularly to performance management methods for an electronic device with multiple central processing units.

Description of the Related Art

Central processing unit (CPU) hot-plug is an operating system mechanism that plugs in one power-gated or power-collapsed CPU, or unplugs one unused CPU. Particularly, on portable devices such as mobile devices, CPU hot-plug is an importance key feature to save battery life.

When determining to plug in one CPU or to unplug it, it is considered not only save power but also retain overall system performance. In most designs, frequently-used factors to determine hot-plugging consist of current CPU frequency, CPU usage, the number of running threads, and so on. However, all of them lack the capability of reflecting what would actually happen after hot-plugging. For example, after plugging in one CPU, if just a thread with a small loading is offloaded to the plugged CPU, the newly-plugged CPU may stay at an idle state for most of the time. In such a case, however, the CPU hot-plug decision by plugging in one CPU gains little performance benefit, whereas it brings much harm to power. It is absolutely a bad trade-off.

BRIEF SUMMARY OF THE INVENTION

Performance management methods for an electronic device with multiple central processing units (CPUs) and related electronic devices are provided.

In an embodiment of a performance management method for an electronic device with multiple central processing units (CPUs), thread loading rearrangement and CPU frequency evaluation are first performed to obtain a plurality of evaluated performance values for different amounts of CPUs, wherein the plurality of evaluated performance values are relevant to power consumption values of the multiple CPUs. It is then determined whether to adjust an amount of used CPUs based on the plurality of evaluated performance values corresponding to the different amounts of CPUs.

An embodiment of an electronic device includes a storage unit, a plurality of central processing units (CPUs) and a performance management unit. The performance management unit is coupled to the storage unit and the CPUs. The performance management unit is arranged for performing thread loading rearrangement and CPU frequency evaluation to obtain a plurality of evaluated performance values for different amounts of CPUs, and determining whether to adjust an amount of used CPUs based on the plurality of evaluated performance values corresponding to the different amounts of CPUs, wherein the plurality of evaluated performance values are relevant to power consumption values of the multiple CPUs.

Performance management methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description shows several exemplary embodiments which carry out the invention. This description is made for the purpose of illustrating the general principles of the invention and should not be taken in a limiting sense. The scope of the invention is best determined by reference to the appended claims.

Performance management methods for an electronic device with multiple central processing units (CPUs) and related electronic devices are provided. Embodiments of the present disclosure provides a performance management method for an electronic device with multiple central processing units, which deduces how much thread workload will be offloaded to a newly-plugged CPU after plugging in one CPU. Moreover, based on such deduction, the performance management method determines whether to adjust target CPU frequency, and then to conclude on if it is the best trade in terms of balance between power and performance.

Figure 1:
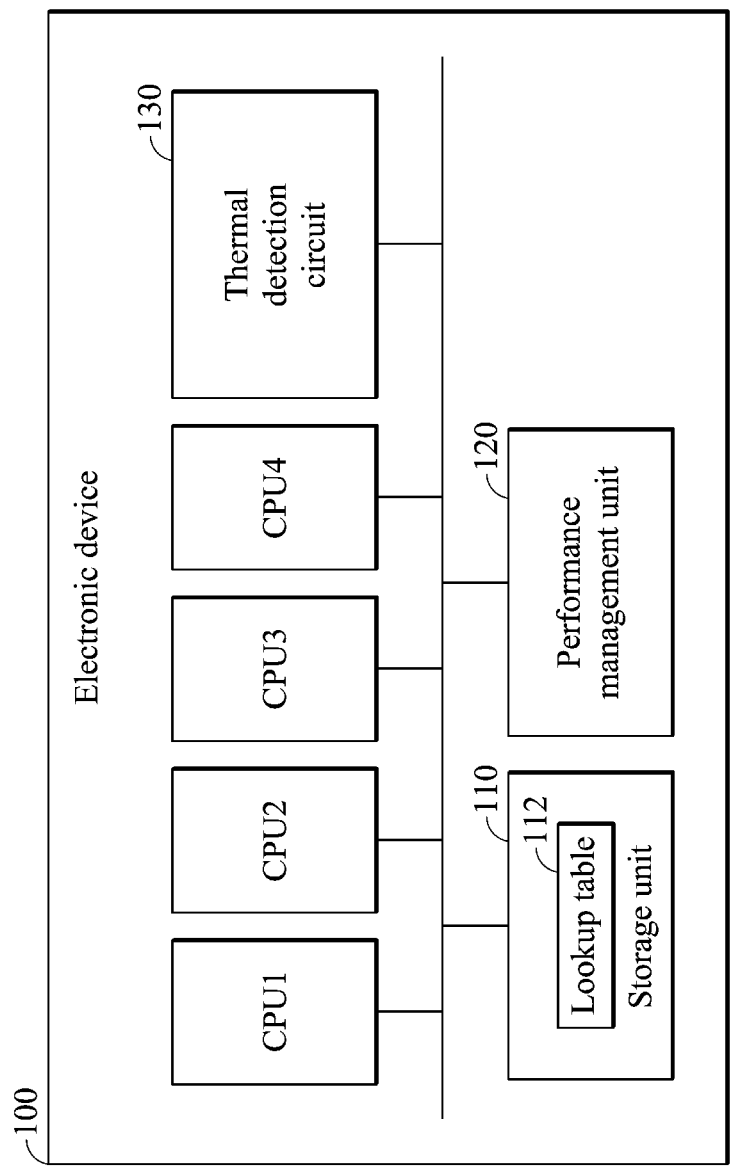
FIG. 1 is a schematic diagram illustrating an embodiment of an electronic device of the invention.

FIG. 1 is a schematic diagram illustrating an embodiment of an electronic device 100 of the invention. The electronic device 100 at least comprises a storage unit 110, multiple central processing units (CPUs) CPU1, CPU2, CPU3 and CPU4 and a performance management unit 120. The electronic device 100 may be an electronic device with multiple CPUs architecture, such as a smartphone, a PDA (Personal Digital Assistant), a laptop computer or a tablet computer, but it is not limited thereto. The storage unit 110 may be a built-in memory, or an external memory card, which stores related data, such as a lookup table 112 which indicates the power relationship between the amount of used CPUs and CPU frequency and related thread information of the multiple central processing units (CPUs) CPU1, CPU2, CPU3 and CPU4, such as the number of running threads for each CPU, the size, type or priority of each thread and so on, to be referenced by the performance management unit 120 for thread (or task) management. Thread loading rearrangement and CPU frequency evaluation between the different central processing units CPU1 to CPU4 can be performed via the performance management unit 120.

The performance management unit 120, which is coupled to the storage unit 110 and the CPUs CPU1, CPU2, CPU3 and CPU4, can perform the performance management method of the present invention for determining whether to adjust the amount of used CPUs (or also referred to as online CPUs), which will be discussed further in the following paragraphs. Note that a CPU is referred to as an unused CPU if no thread is running thereon and a CPU is referred to as a used CPU if there are threads running thereon.

To be more specific, prior to opening/plugging in or shutting down/unplugging a CPU, the performance management unit 120 performs thread loading rearrangement for dispatching the running threads to different amounts of used CPUs to deduce thread load distribution before opening or shutting down a CPU, then evaluates a number of performance values and determines whether to open or shut down the CPU based on the evaluated performance values.

Figure 2:
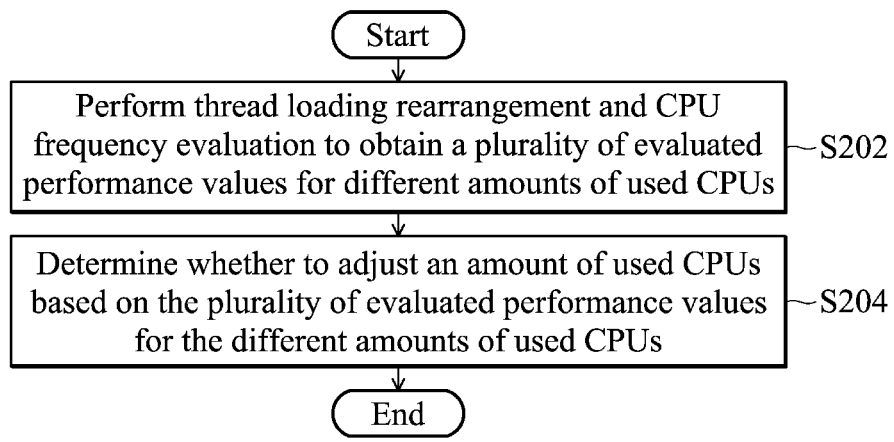
FIG. 2 is a flowchart of an embodiment of a performance management method of the invention.

FIG. 2 is a flowchart of an embodiment of a performance management method of the invention. The performance management method can be used for an electronic device with multiple CPUs, such as a PDA, a smart phone, a mobile phone, a laptop computer or a tablet computer. For example, the performance management method can be performed by the performance management unit 120 of the electronic device 100 shown in FIG. 1.

It should be noted that the original CPU hot-plug (CPU opens on and shutdown) decision is triggered when specific or periodical events occur, such as each CPU frequency changes and so on. The criteria of opening a new CPU may be, for example, that the number of running threads is over a pre-defined threshold, the CPU loading is over a pre-defined threshold, and so on. It is determined to open a new CPU immediately and adjust CPU frequency accordingly if the criteria of opening new CPU have been met. In this embodiment, load balancing for threads among used CPUs will be deduced prior to opening a new CPU or shutting a CPU down when specific or periodical events occur.

In step S202, when specific or periodical events (e.g. CPU frequency changed and so on) occur, thread loading rearrangement and CPU frequency evaluation are performed to obtain a plurality of evaluated performance values for different amounts of CPUs, wherein the plurality of evaluated performance values are relevant to power consumption values of the different amounts of CPUs. For example, if there are total 10 CPUs in the electronic device 100 and 5 CPUs are currently being used, the different amounts of CPUs can be a first amount of used CPUs equals to 5, a second amount of used CPUs equals to 6, and a third amount of used CPUs equals to 4, respectively, wherein the first amount is the amount of CPUs being currently used, the second amount is greater than the first amount for indicating that an unused CPU is selected to be opened and the third amount is smaller than the first amount for indicating that a CPU is selected to be removed from the currently used CPUs. Therefore, thread loading rearrangement and CPU frequency evaluation are performed to obtain a first, second and third evaluated performance values corresponding to the first, second and third amounts of used CPUs, respectively.

The thread loading rearrangement is performed to deduce and distribute thread loading between the evaluated amount of the used CPUs. Since the algorithms of deducing and distributing thread loading are pervasively used in current operation system scheduler, the detail of the algorithm is not described here. However, it should be noted that, unlike current operating system scheduler uses these two algorithms directly for thread load balancing/arrangement among CPUs, the embodiment of present invention is to utilize these two algorithms for deducing thread loading and evaluating the evaluated performance values which will describe more detail later. The CPU frequency evaluation is performed to re-evaluate a frequency value corresponding to that amount of used CPUs based on the rearranged thread loading. If a new thread is created or terminated, the CPU frequency evaluation could be performed, as an embodiment, by checking the historic CPU frequency record of the thread while it was in running state. In one embodiment, the thread loading rearrangement can be performed to deduce how many thread loading can be shared to a new CPU and the CPU frequency evaluation can be further performed to evaluate how to adjust current CPU frequency based on the deduced result in the case that the new CPU is opened. In another embodiment, the thread loading rearrangement can be performed to deduce how many thread loading can be taken from a CPU which is selected to be shut down and the CPU frequency evaluation can be further performed to evaluate how to adjust current CPU frequency based on the deduced result in the case that the selected CPU is shut down.

In some embodiments, the first, second and third evaluated performance values corresponding to the first, second and third amounts of used CPUs can be obtained from a lookup table (e.g. the lookup table 112) which is stored in the storage unit 110 and stores the power relationship between the amount of used CPUs and CPU frequency. In other words, an evaluated performance value corresponding to a specific amount of used CPUs can be found by table lookup operation based on the amount of used CPUs and the re-evaluated CPU frequency value of the amount of used CPUs. The lookup table 112 may be pre-defined in manufactory, or learnt and built while system of the electronic 100 is running.

Figure 3:
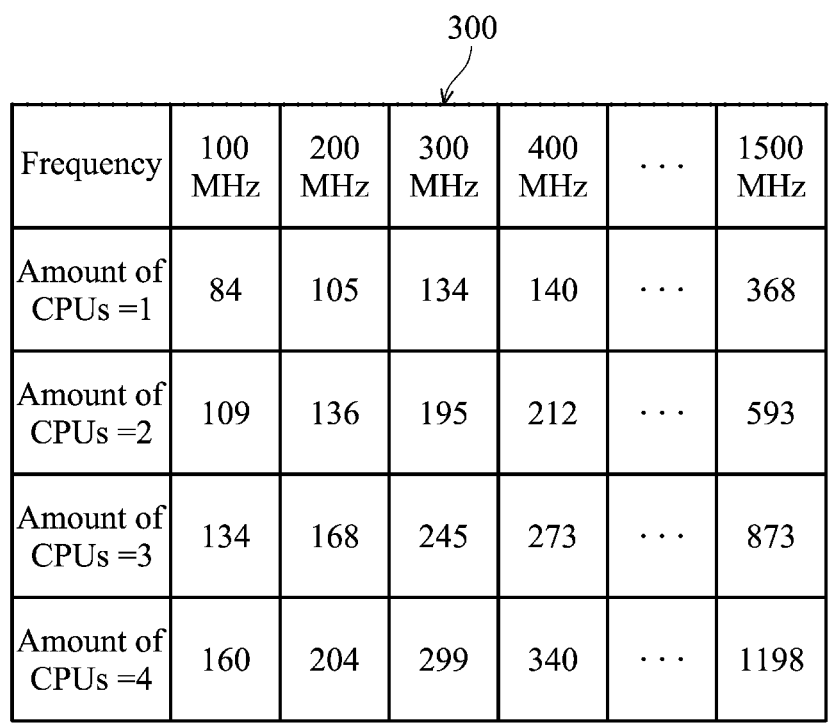
FIG. 3 is a schematic diagram illustrating an embodiment of a lookup table according to the invention.

FIG. 3 is a schematic diagram illustrating an embodiment of a lookup table 300 according to the invention. Referring to FIG. 3, the lookup table 300 comprises fields regarding the amount of used CPUs and the re-evaluated CPU frequency value and responsive performance values in unit of mA. It is understood that, in the lookup table 300, the larger the value is, the more the power consumed at that amount of used CPUs and CPU frequency is. For example, as shown in the lookup table 300 of FIG. 3, when a first amount of used CPUs is 3 and the CPU frequency is 400 MHz, by table lookup operation, a first evaluated performance value of 273 (mA) can be obtained. If it is then deduced that the CPU frequency is adjusted to 300 MHz when the amount of used CPUs is changed to a second amount equal to 4, by table lookup operation, a second evaluated performance value of 299 (mA) can be obtained. Similarly, if it is deduced that the CPU frequency is adjusted to 1500 MHz when the amount of used CPUs is changed to a third amount equal to 2, by table lookup operation, a third evaluated performance value of 593 (mA) can be obtained.

After the evaluated performance values for the different amounts of CPUs (e.g. the first, second and third evaluated performance values corresponding to the first, second and third amounts of used CPUs) have been obtained, in step S204, It is then determined whether to adjust an amount of used CPUs based on the plurality of evaluated performance values corresponding to the different amounts of CPUs.

In some embodiments, the step of determining whether to adjust the amount of used CPUs may further comprise the step of comparing the first, second and third evaluated performance values. When the second evaluated performance value corresponding to the second amount of used CPUs is smaller than the first and third evaluated performance values, it is determined to adjust the amount of used CPUs from the first amount to the second amount. When the third evaluated performance value corresponding to the third amount of used CPUs is smaller than the first and second evaluated performance values, it is determined to adjust the amount of used CPUs from the first amount to the third amount. When the first evaluated performance value corresponding to the first amount of used CPUs is smaller than the second and third evaluated performance values, it is determined to keep the amount of used CPUs unchanged.

Thus, the first evaluated performance value is compared with the second evaluated performance value indicating the deduction result for the second amount of used CPUs and the third evaluated performance value indicating the deduction result for the third amount of used CPUs. When the first evaluated performance value is the smallest value between all of the evaluated performance values, it is determined that keeping the number of CPUs unchanged is the best choice. When the second evaluated performance value is the smallest value among all of the evaluation values, it is determined that opening a CPU is the best choice.

In the following embodiments, the amount of used CPUs can be adjusted to the second amount by opening an unused CPU, and the amount of used CPUs can be adjusted to the third amount by shutting down a CPU selected from the first amount of used CPUs, but the invention is not limited thereto. Note that the number of the CPU to be opened or shut down is not limit to one. In other words, in some embodiments, the amount of used CPUs can be adjusted by opening or shutting down more than one CPU.

Figure 4:
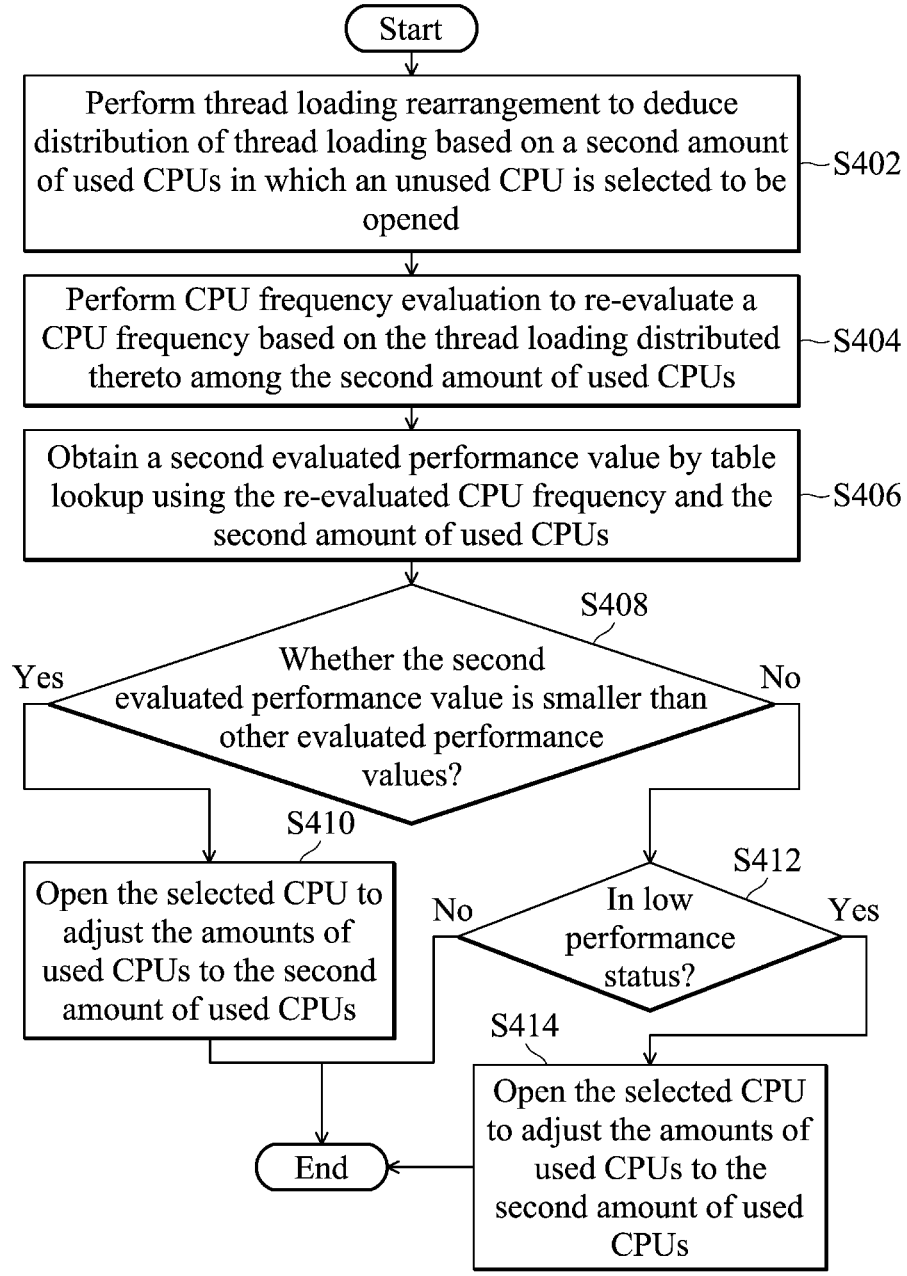
FIG. 4 is a flowchart of another embodiment of a performance management method for determining whether to open a new CPU of the invention.

FIG. 4 is a flowchart of another embodiment of a performance management method for determining whether to open a new CPU of the invention. The performance management method can be used for an electronic device with multiple CPUs, such as a PDA, a smart phone, a mobile phone, a laptop computer or a tablet computer. For example, the performance management method can be performed by the performance management unit 120 of the electronic device 100 shown in FIG. 1. In this embodiment, it is assumed that there are total 4 CPUs in the electronic device 100 and 3 CPUs are being currently used, i.e. a first amount of used CPUs equals to 3.

First, thread loading rearrangement is performed to deduce distribution of thread loading based on a second amount of used CPUs in which an unused CPU is selected to be opened (step S402). For example, the second amount of used CPUs equals to 4. Then, CPU frequency evaluation is performed to re-evaluate a CPU frequency based on the thread loading distributed thereto among the second amount of used CPUs (step S404). The thread loading rearrangement is performed to deduce how many thread loading can be shared to the newly-opened CPU and the CPU frequency evaluation is performed to evaluate a frequency value based on the deduced result. With the deduced result of distribution of thread loading to open a new CPU, as the thread loading is shared globally, the current CPU frequency of the second amount of used CPUs can be decreased.

Thereafter, a second evaluated performance value is obtained by table lookup operation using the re-evaluated CPU frequency and the second amount of used CPUs (step S406). For example, referring to the lookup table 300 of FIG. 3, if the re-evaluated CPU frequency value of the second amount of used CPUs is 300 MHz and the second amount equals to 4, by table lookup operation, the second evaluated performance value of 299 (mA) can be obtained.

The second evaluated performance value obtained is to be compared with other evaluated performance values, such as a first evaluated performance value indicating the deduction result for the first amount of used CPUs and a third evaluated performance value indicating the deduction result for the third amount of used CPUs to evaluate if it is the best trade to save more power as well as retain or improve overall performance in terms of opening a new CPU. In this embodiment, it should be noted that the second amount of used CPUs running at a specific CPU frequency or the third amount of used of CPUs running at a specific CPU frequency is selected to compare with the first amount of used CPUs is because they are satisfied options for balancing the thread loading while the thread loading of the amount of used CPUs is changed.

It is then determined whether the second evaluated performance value is smaller than other evaluated performance values (step S408). When the second evaluated performance value is smaller than other evaluated performance values (Yes in step S408), which means that the deduction of load balancing indicates that to open an unused CPU is more power-saving, it is determined to open the selected CPU to adjust the amounts of used CPUs from the first amount to the second amount (step S410). For example, the selected CPU is opened to adjust the amounts of used CPUs to 4. That is, 4 CPUs will be used after determination.

If the second evaluated performance value is greater than any of other evaluated performance values (No in step S408), it is then determined whether currently evaluated CPU is in low performance status (step S412). A CPU is determined as in the low performance status if that performance for that CPU is getting into critical situation, such as a certain number of running tasks running in low performance, waiting in run-queue too long, getting less and less CPU resource, and so on. If the currently evaluated CPU is in low performance status (Yes in step S412), it is determined to open the selected CPU to adjust the amounts of used CPUs from the first amount to the second amount (step S414). If the currently evaluated CPU is not in low performance status (No in step S412), which means that the deduction of load balancing indicates that to open an unused CPU cannot actually distribute loading evenly, it is determined not to open the new CPU and flow ends. Thus, the amount of used CPUs keeps unchanged. That is, 3 CPUs will be used after determination.

In this embodiment, the CPU frequency evaluation is performed to re-evaluate a frequency value corresponding to the second amount of used CPUs and the CPU frequency is adjusted to the re-evaluated frequency value after the unused CPU is opened. It should be understood that the overhead of the performance method would be increased once the order for opening the CPU is revised.

Figure 5:
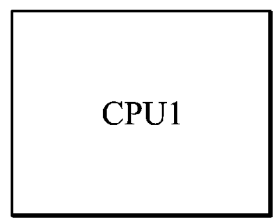
FIG. 5 is a schematic diagram illustrating an embodiment of a CPU configuration according to the invention.
Figure 5:
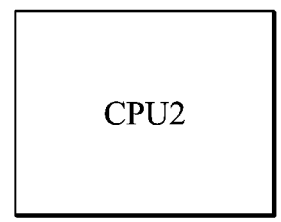
Figure 5:
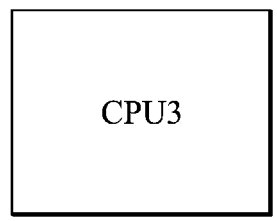
Figure 5:
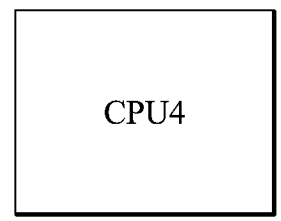

Conventionally, to open CPU which is very close to other running/used CPUs often results in poor heat dissipation and can easily cause the electronic device to crash due to overheating. Thus, in some embodiments, thermal selection is further provided to poll the temperature from a thermal detection circuit around the CPUs to determine which CPU should be opened. Referring back to FIG. 1, a thermal detection circuit 130 with a plurality of sensors (not shown) is further provided for detecting the temperatures of each CPU and providing temperature information corresponding to each CPU. The thermal selection of the invention can be performed by the performance management unit 120 according to the temperature information provided by the sensors, wherein the CPU with the lowest temperature can be selected to open. To be more specific, the performance management unit 120 may obtain temperature information for each of the unused CPUs through the thermal detection circuit 130 and select to open the unused CPU with the lowest temperature value among the obtained temperature information. FIG. 5 is a schematic diagram illustrating an embodiment of a CPU configuration 500 of the invention. In the CPU configuration 500, four CPUs CPU1, CPU2, CPU3 and CPU4 are illustrated, wherein the CPU1 is currently used CPU while the CPU2, CPU3 and CPU4 are unused CPUs. According to the thermal selection of the disclosure, as the distance between the CPU1 and the CPU4 is longer than that of the CPU2 and the CPU3, the temperature value for the CPU4 should be lower than that of the CPU2 and the CPU3 and thus the CPU4 is selected to be opened. Thus, with the thermal selection of the disclosure, the unused CPU which has the longer distance to other used CPUs in circuits can be selected to open so that there is less interactive effect of temperature of CPUs and heat could be dissipated as quickly as possible, thereby efficiently avoiding overheating.

Figure 6:
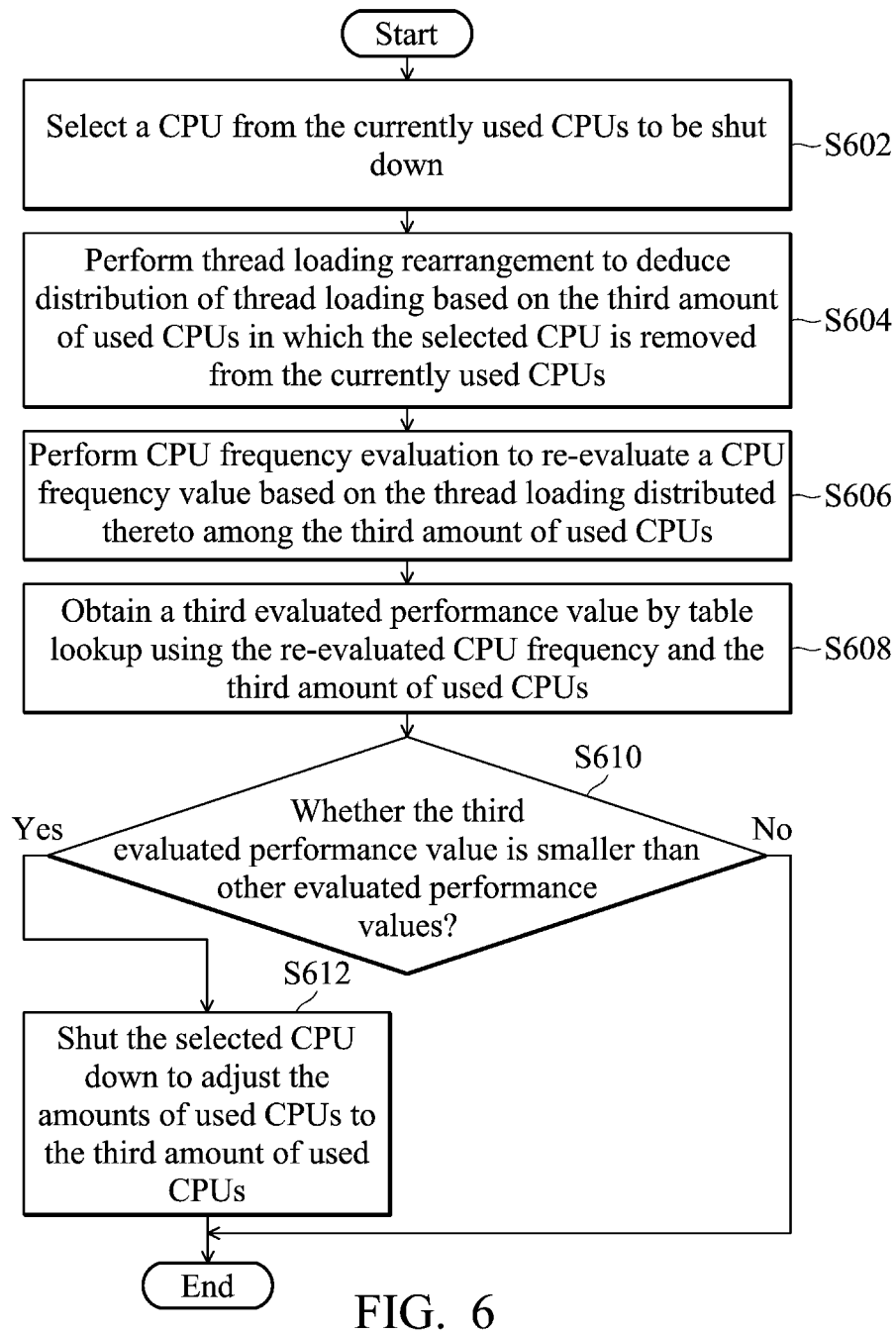
FIG. 6 is a flowchart of another embodiment of a performance management method for determining whether to shut down a CPU of the invention.

FIG. 6 is a flowchart of another embodiment of a performance management method for determining whether to shut down a CPU of the invention. The performance management method can be used for an electronic device with multiple CPUs, such as a PDA, a smart phone, a mobile phone, a laptop computer or a tablet computer. For example, the performance management method can be performed by the performance management unit 120 of the electronic device 100 shown in FIG. 1. In this embodiment, it is assumed that there are total 4 CPUs in the electronic device 100 and 3 CPUs are being currently used, i.e. a first amount of used CPUs equals to 3.

First, a CPU to be shut down is selected from the currently used CPUs (step S602). For example, the slowest frequency CPU among all CPUs which are currently used as well as not in critical performance situation can be selected to be shut down. Thread loading rearrangement is then performed to deduce distribution of thread loading based on the third amount of used CPUs in which the selected CPU is removed from the currently used CPUs (step S604). For example, the third amount of used CPUs equals to 2. Then, CPU frequency evaluation is performed to re-evaluate a CPU frequency value based on the thread loading distributed thereto among the third amount of used CPUs (step S606). The thread loading rearrangement is performed to deduce how many thread loading can be taken from the selected CPU and the CPU frequency evaluation is performed to evaluate a frequency value based on the deduced result. With the deduced result of distribution of thread loading to shut down a CPU, as the thread loading is shared globally, the current CPU frequency of the third amount of used CPUs should be increased.

Thereafter, a third evaluated performance value is obtained by table lookup operation using the re-evaluated CPU frequency and the third amount of used CPUs (step S608). For example, referring to the lookup table 300 of FIG. 3, if the re-evaluated CPU frequency value of the third amount of used CPUs is 1500 MHz and the third amount equals to 2, by table lookup operation, the third evaluated performance value of 593 (mA) can be obtained.

The third evaluated performance value obtained is to be compared with other evaluated performance values to evaluate if it is the best trade to save more power as well as retain or improve overall performance in terms of shutting the selected CPU down.

It is then determined whether the third evaluated performance value is smaller than other evaluated performance values (step S610). When the third evaluated performance value is smaller than other evaluated performance values (Yes in step S610), which means that the deduction of load balancing indicates that to shut the selected CPU down is more power-saving, it is determined to shut the selected CPU down to adjust the amounts of used CPUs from the first amount to the third amount (step S612). For example, the selected CPU is closed to adjust the amounts of used CPUs to 2. That is, 2 CPUs will be used after determination.

In this step, the CPU frequency evaluation is performed to re-evaluate a frequency value corresponding to the third amount of used CPUs and the CPU frequency is adjusted to the re-evaluated frequency value before the selected CPU is shut down.

When the third evaluated performance value is greater than any of other evaluated performance values (No in step S610), it is determined not to shut the selected CPU down and flow ends. Thus, the amount of used CPUs keeps unchanged. That is, 3 CPUs will be used after determination.

Figure 7:
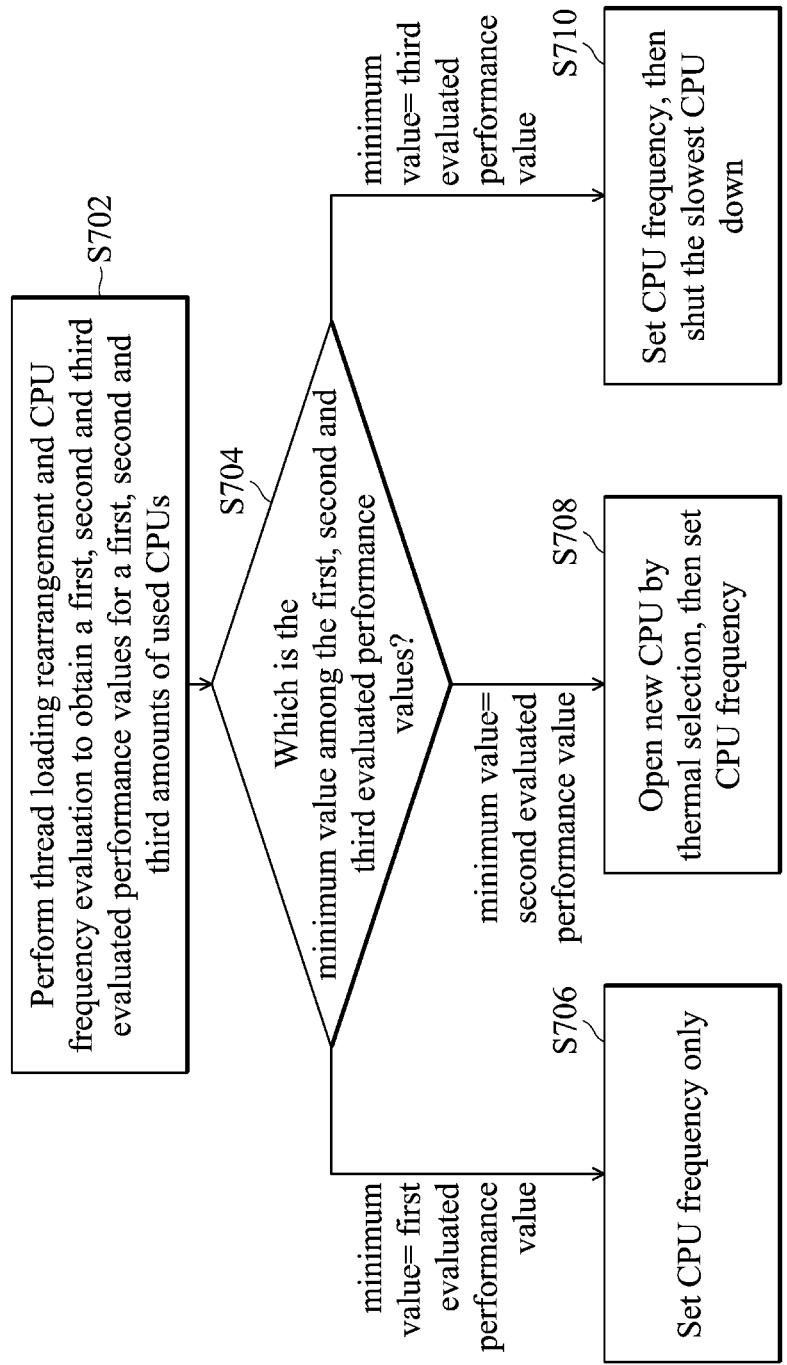
FIG. 7 is a flowchart of another embodiment of a performance management method for determining whether to opening or shutting down a CPU of the invention.

FIG. 7 is a flowchart of another embodiment of a performance management method for determining whether to opening or shutting down a CPU of the invention. The performance management method can be used for an electronic device with multiple CPUs, such as a PDA, a smart phone, a mobile phone, a laptop computer or a tablet computer. For example, the performance management method can be performed by the performance management unit 120 of the electronic device 100 shown in FIG. 1. In this embodiment, it is assumed that there are total 4 CPUs in the electronic device 100 and 3 CPUs are being currently used, i.e. a first amount of used CPUs equals to 3.

When CPU hot-plug decision is triggered due to occurrence of specific or periodical events (such as each CPU frequency changes and so on), thread loading rearrangement and CPU frequency evaluation are performed to obtain a first, second and third evaluated performance values for a first, second and third amounts of used CPUs, respectively (step S702). In this step, the second amount of used CPUs, which includes an unused CPU selected to be opened is greater than the first amount, and the third amount of used CPUs, which removes the smallest CPU from the current used CPUs, is smaller than the first amount. For example, in this embodiment, the second amount of used CPUs equals to 4 and the third amount of used CPUs equals to 2. Note that steps S402 to S406 described in FIG. 4 or steps S604 to S608 described in FIG. 6 can be performed to obtain the first, second and third evaluated performance values, thus details are omitted here for brevity.

After the first, second and third evaluated performance values have been obtained, it is then determined which evaluated performance value is the minimum value among the first, second and third evaluated performance values (step S704). If it is determined that the first evaluated performance value is the minimum value in step S704, step S706 is performed to set CPU frequency to the re-evaluated frequency value only and keep the amount of used CPUs unchanged. That is, no CPU will be opened or shut down after determination. If it is determined that the second evaluated performance value is the minimum value in step S704, step S708 is performed to open the newly selected CPU by thermal selection and then set CPU frequency to the re-evaluated frequency value. If it is determined that the third evaluated performance value is the minimum value in step S704, step S710 is further performed to set CPU frequency to the re-evaluated frequency value first and then shut the selected CPU down. Therefore, based on deduction for opening one new CPU, the deduction for shutting the slowest frequency CPU down and the deduction for changing the CPU frequency only, the solution that is able to save the most power and retain overall system performance will be picked as the winner for performance management.

For example, if the currently CPU frequency for the first amount of used CPU is 400 MHz and it is adjusted to a frequency value of 300 MHz and 1500 MHz for the second and third amounts of used CPUs, respectively, by table lookup operation using the lookup table 300 in FIG. 3, the first, second and third evaluated performance values are 273, 299 and 593, respectively. As the first evaluated performance value is the minimum value among all of the evaluated performance values, step S706 is performed to set CPU frequency only and the amount of used CPUs keeps unchanged. That is, no CPU will be opened or shut down. In another embodiment, if the first, second and third evaluated performance values are 273, 204 and 593, respectively, step S708 is performed to open the newly selected CPU by thermal selection and then set CPU frequency to the re-evaluated frequency value.

In summary, the performance management methods for an electronic device with multiple CPUs and related electronic devices of the invention can deduce the distribution of thread loading prior to opening or shutting down the CPU(s), then determine if the current CPU frequency can be adjusted accordingly and evaluate a number of performance values, and determine whether to open or shut down the CPU based on the evaluated performance values to make the best decision in which balanced is sought between power and performance for the amount of used CPUs, thus saving power and resulting in a longer battery life.

Performance management methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A performance management method for an electronic device with multiple central processing units (CPUs), comprising:
   performing thread loading rearrangement and CPU frequency evaluation to obtain a plurality of evaluated performance values for different amounts of CPUs, wherein the plurality of evaluated performance values are relevant to power consumption values of the multiple CPUs; and
   determining whether to adjust an amount of used CPUs based on the plurality of evaluated performance values corresponding to the different amounts of CPUs,
   wherein the step of performing thread loading rearrangement and CPU frequency evaluation to obtain the plurality of evaluated performance values for the different amounts of CPUs further comprises:
      performing thread loading rearrangement and CPU frequency evaluation to obtain a first, second and third evaluated performance values for a first, second and third amounts of used CPUs, respectively,
   wherein the first amount of used CPUs indicates the amount of CPUs which are being currently used, the second amount of used CPUs indicates the amount of CPUs which are being currently used plus an amount of CPUs assumed to be opened, and the third amount of used CPUs indicates the amount of CPUs which are being currently used minus the amount of CPUs assumed to be shut down, and
   wherein the step of performing thread loading rearrangement and CPU frequency evaluation to obtain the first, second and third evaluated performance values for the first, second and third amounts of used CPUs further comprises:
      performing the thread loading rearrangement to deduce an amount of thread loading that can be distributed to the amount of CPUs assumed to be opened or deduce an amount of thread loading that can be taken from the amount of CPUs assumed to be shut down;
      performing the CPU frequency evaluation to obtain a respective predicted CPU frequency for the first, second and third amounts of used CPUs based on the deduced result; and
      evaluating the first, second and third evaluated performance values for the first, second and third amounts of used CPUs, respectively, based on the predicted CPU frequencies.

2. The method of claim 1, wherein the step of determining whether to adjust the amount of used CPUs further comprises:
   comparing the first, second and third evaluated performance values;
   determining to adjust the amount of used CPUs from the first amount to the second amount when the second evaluated performance value corresponding to the second amount of used CPUs is smaller than the first and third evaluated performance values; and
   determining to adjust the amount of used CPUs from the first amount to the third amount when the third evaluated performance value corresponding to the third amount of used CPUs is smaller than the first and second evaluated performance values.

3. The method of claim 2, wherein the amount of used CPUs is adjusted to the second amount by opening an unused CPU, and the amount of used CPUs is adjusted to the third amount by shutting down a CPU selected from the first amount of used CPUs.

4. The method of claim 3, wherein the CPU frequency evaluation is performed to re-evaluate a frequency value corresponding to the second amount of used CPUs and the CPU frequency is adjusted to the re-evaluated frequency value after the unused CPU is opened.

5. The method of claim 3, wherein the CPU frequency evaluation is performed to re-evaluate a frequency value corresponding to the third amount of used CPUs and the CPU frequency is adjusted to the re-evaluated frequency value before the selected CPU is shut down.

6. The method of claim 3, further comprising:
when the second evaluated performance value corresponding to the second amount of used CPUs is greater than the first and third evaluated performance values, determining whether currently evaluated CPU is in a low-performance status; and
determining to adjust the amount of used CPUs from the first amount to the second amount when the currently evaluated CPU is in the low-performance status.

7. The method of claim 3, further comprising:
providing a temperature information for each of unused CPUs in the CPUs; and
selecting the unused CPU with the lowest temperature value among the provided temperature information to open.

8. The method of claim 3, wherein the CPU which is selected from the first amount of used CPUs to be shut down is the lowest frequency CPU among the first amount of used CPUs.

9. The method of claim 1, wherein the first, second and third evaluated performance values are obtained by table lookup operation using a lookup table.

10. An electronic device, comprising:
a storage unit;
a plurality of central processing units (CPUs); and
a performance management unit coupled to the storage unit and the CPUs, performing thread loading rearrangement and CPU frequency evaluation to obtain a plurality of evaluated performance values for different amounts of CPUs, and determining whether to adjust an amount of used CPUs based on the plurality of evaluated performance values corresponding to the different amounts of CPUs, wherein the plurality of evaluated performance values are relevant to power consumption values of the plurality of CPUs,
wherein the performance management unit further performs thread loading rearrangement and CPU frequency evaluation to obtain a first, second and third evaluated performance values for a first, second and third amounts of used CPUs, respectively, wherein the first amount of used CPUs indicates the amount of CPUs which are being currently used, the second amount of used CPUs indicates the amount of CPUs which are being currently used plus an amount of CPUs assumed to be opened, and the third amount of used CPUs indicates the amount of CPUs which are being currently used minus the amount of CPUs assumed to be shut down, and
wherein the performance management unit further performs thread loading rearrangement and CPU frequency evaluation to obtain the first, second and third evaluated performance values for the first, second and third amounts of used CPUs by performing the thread loading rearrangement to deduce an amount of thread loading that can be distributed to the amount of CPUs assumed to be opened or deduce an amount of thread loading that can be taken from the amount of CPUs assumed to be shut down, performing the CPU frequency evaluation to obtain a respective predicted CPU frequency for the first, second and third amounts of used CPUs based on the deduced result and evaluating the first, second and third evaluated performance values for the first, second and third amounts of used CPUs, respectively, based on the predicted CPU frequencies.

11. The electronic device of claim 10, wherein the performance management unit further compares the first, second and third evaluated performance values, wherein the performance management unit determines to adjust the amount of used CPUs from the first amount to the second amount when the second evaluated performance value corresponding to the second amount of used CPUs is smaller than the first and third evaluated performance values, and determines to adjust the amount of used CPUs from the first amount to the third amount when the third evaluated performance value corresponding to the third amount of used CPUs is smaller than the first and second evaluated performance values.

12. The electronic device of claim 11, wherein the performance management unit adjusts the amount of used CPUs to the second amount by opening an unused CPU, and adjusts the amount of used CPUs the third amount by shutting down a CPU selected from the first amount of used CPUs.

13. The electronic device of claim 12, wherein the CPU frequency evaluation is performed to re-evaluate a frequency value corresponding to the second amount of used CPUs and the CPU frequency is adjusted to the re-evaluated frequency value after the unused CPU is opened.

14. The electronic device of claim 12, wherein the CPU frequency evaluation is performed to re-evaluate a frequency value corresponding to the third amount of used CPUs and the CPU frequency is adjusted to the re-evaluated frequency value before the selected CPU is shut down.

15. The electronic device of claim 12, wherein when the second evaluated performance value corresponding to the second amount of used CPUs is greater than the first and third evaluated performance values, the performance management unit further determines whether currently evaluated CPU is in a low-performance status, and determines to adjust the amount of used CPUs from the first amount to the second amount when the currently evaluated CPU is in the low-performance status.

16. The electronic device of claim 12, further comprising a thermal detection circuit with a plurality of sensors for providing a temperature information for each of the CPUs, wherein the performance management unit further obtains a temperature information for each of unused CPUs in the CPUs through the thermal detection circuit and selects the unused CPU with the lowest temperature value among the obtained temperature information to open.

17. The electronic device of claim 12, wherein the storage unit further stores a lookup table and the performance management unit further obtains the first, second and third evaluated performance values by table lookup operation using the lookup table.

18. The electronic device of claim 12, wherein the CPU which is selected from the first amount of used CPUs to be shut down is the lowest frequency CPU among the first amount of used CPUs.

* * * * *